UNITED STATES PATENT OFFICE.

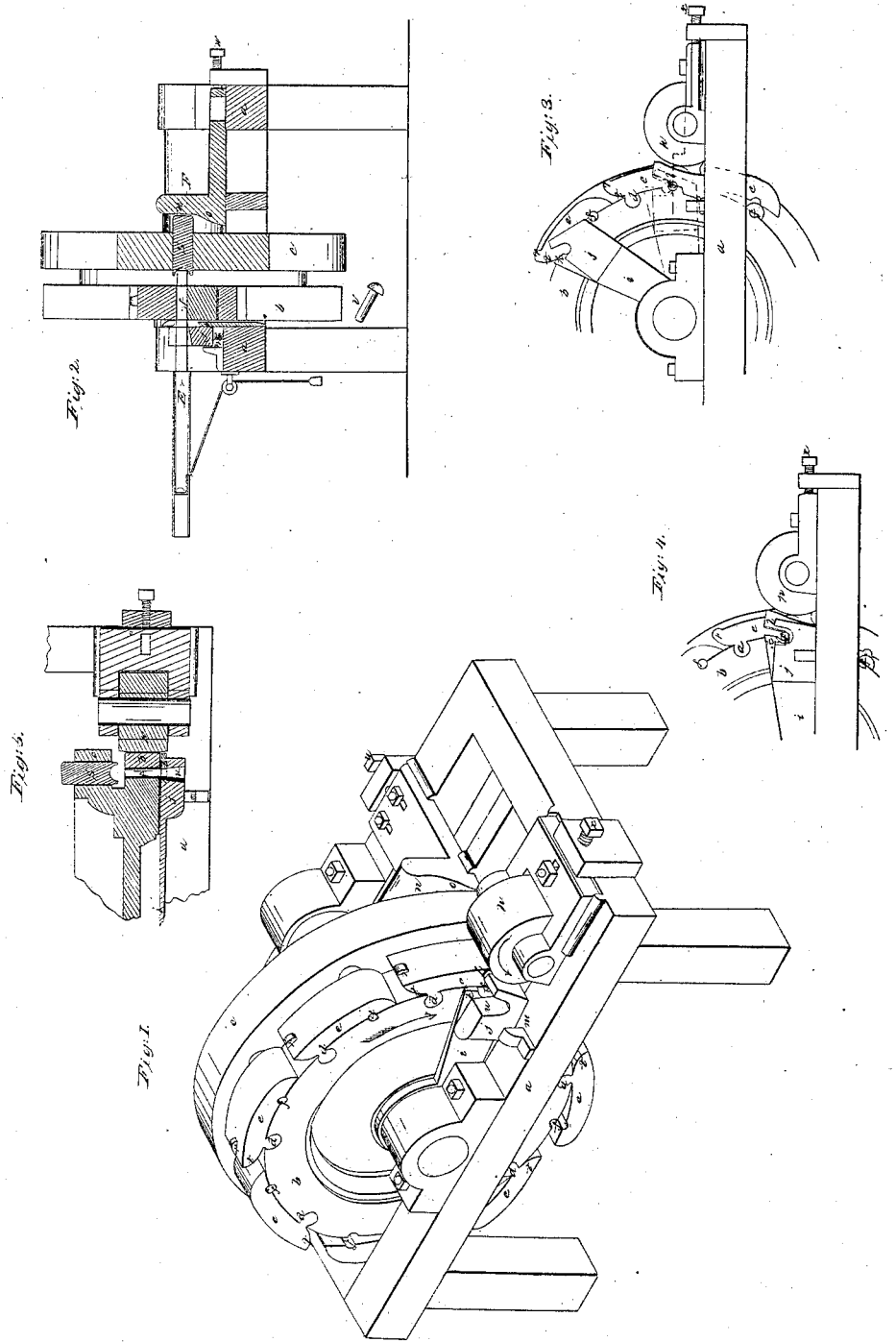

JOEL R. BASSETT, OF CINCINNATI, OHIO.

MACHINE FOR MAKING BOLTS AND RIVETS.

Specification of Letters Patent No. 17,660, dated June 30, 1857.

*To all whom it may concern:*

Be it known that I, JOEL R. BASSETT, of Cincinnati, Hamilton county, Ohio, have invented new and useful Improvements in Machinery for Making Bolts and Rivets; and I hereby declare the following to be a clear and exact description thereof, reference being had to the accompanying drawings, making part of this specification.

My invention relates to: 1st. The arrangment of clamps and heading dies in a rotary stock, in such form and manner, as that they are all easily accessible for inspection and replacement whether at rest or in motion. 2nd. Combining therewith a feed rest and stationary cutter of such construction as to facilitate the feeding of the rod, enable the rotation of the clamp stock to sever the blank without expanding the point of the rod and afford support to the point of the bolt or rivet during the process of heading. 3rd. A provision for releasing the formed bolt or rivet.

In the accompanying drawings, Figure 1 represents a perspective view of the machine at that period of its rotation when it is adapted to receive the rod; Fig. 2 a vertical section through a clamp and die, the rod (shown by red lines) having been just fed in, and Fig. 3 a side elevation of the clamping and cutting mechanism, the parts being in the same position as in Fig. 2 except that the yielding rest and its attached cutter are thrown up so as to expose the relative position at this stage of the stationary portion of the cutter. Fig. 4 exhibits the same parts at the commencement of the separation of the blank, the movable cutter and yielding rest being in their lowest position. Fig. 5 is a horizontal section (through the same parts) at the line E, F, Fig. 2.

($a$) is a frame supporting a circular, rotating casting ($b$ $c$), of which the part ($c$) is of somewhat the larger diameter. The part ($b$) I call the "clamp stock" and the part ($c$) the "header stock."

At equal distances around the clamp stock and formed to fit and lie snugly upon its periphery are a series of jaws ($e$) called by me "clamps." These clamps are hinged to the clamp stock at ($d$) and have their heels ($t$) rounded off on the inner side as represented and on the outer side provided with protuberances ($r$). Semicylindrical cavities are formed across the periphery of the clamp stock and corresponding concave face of each clamp making together apertures ($f$) which are adapted to nip the rod or blank tightly when the clamp is in nearly close contact with the stock. Formed to turn on the shaft of the clamp stock between the latter and the plumber block is an arm ($i$) terminating in a head ($j$) which being provided with a suitable cavity ($u$) in its upper edge, forms the rest on which the rod is fed to the clamps. The cavity ($u$) is broad at top and in front, narrowing downward and backward to about the size of the rod to be worked. In its normal or inactive position the rest ($j$) is supported by a spring ($m$) in the position shown in Figs. 1 and 2.

($k$) ($l$) are two jaws of a cutter whose inner or cutting edges converge downward and backward in form corresponding with the cavity ($u$) but of slightly smaller dimensions. Of these, the jaw ($k$) which is nearest the shaft is attached to and rises and falls with the vibrating or yielding rest ($i$ $j$) while the portion ($l$) is made fast to the frame ($a$). While the rest ($i$, $j$,) is in its upper position the jaws ($k$) ($l$) are so far apart as to admit of the free passage of the rod to be worked; but on the depression of the rest they contract tightly on the rod, their faces next the clamp stock presenting a semi-circular cutting edge of slightly smaller radius than the rod. Opposite to and in a line with each clamp aperture ($f$) is a header ($s$) occupying a suitable socket in the header stock ($c$).

($n$, $o$,) is an adjustable stationary cam, having the upper portion ($n$) of its face nearly parallel with the plane of rotation of the stock ($b$, $c$,) while the lower portion ($o$) inclines toward the stock. The adjustment of this cam is effected by means of a set screw ($w$).

($p$) is a friction roller, adjustable horizontally in the direction of the clamp stock ($b$) by means of the set screw ($x$).

The form and position of the clamp jaws ($d$, $e$,) are such that they are during a large portion of their revolution exposed to inspection and are capable of being readily withdrawn (whether the machine be at rest or in motion) in a direction parallel with the axis of rotation of the stock, without impairing the operation of those which remain. It is thus unnecessary to stop the machine in order to remove a faulty clamp to which an accident may have occurred while in use.

The operation is as follows: The stock (b, c,) being made to rotate in the direction of the arrow, a rod is placed in the cavity (u) of the rest and being held with its end in contact with the face of the clamp-stock, either by hand or by a weighted follower (as represented by red lines in Fig. 2) enters readily the first aperture (f) which is presented; before the contraction of the clamp, the vertical face (n) of the cam supporting the header (s) in such manner that it forms a gage for the feeding of the rod. The stock (b, c,) continuing to rotate the clamp (e) by means of the friction roller (p) is made to press forcibly on the portion of the rod within its grasp while the downward pressure of that within the rest (j) depresses the latter, causing the jaws (k) (l) to contract tightly on the end of the rod thus effectually preventing its expansion while the clamp is severed therefrom by the rotation of the clamp stock. The roller (p) continuing to hold the clamp tightly compressed, the vertical face of the plate (l) now forms a support to the point of the blank while the header (s) being pressed against the inclined face (o) of the cam is thereby impelled forward in such manner as to form the head of the bolt or rivet; after which the formed bolt or rivet (v) is liberated, by the teat (r) impinging against the roller (p) and retracting the clamp (e). Where the cutter is not required to compress the end of the rod it may be in one piece and wholly stationary but I prefer the divided form in all cases. A suitable spring may be employed to retract the heading die.

I claim as new and of my invention herein—

1. The clamps (e, f, d, r, t) constructed substantially as described, and arranged on the periphery of a rotating stock in such manner as to be readily accessible for inspection and replacements; in combination with the friction roller (p) for the clamping and releasing of the bolt or rivet.

2. In combination with the above; the yielding rest (i j) and divided cutter (k, l,) by means of which the rotation of the clamp stock severs the blank, the end of the rod being contracted during the act of separation and afterward released by the retraction of the rest and cutter (i, j, k).

3. The arrangement of heading dies (s) and adjustable, stationary cam (n, o,) in combination with the clamps and the perpendicular face of the plate (l), substantially as and for the purposes set forth.

In testimony of which invention I hereunto set my hand.

JOEL R. BASSETT.

Attest:
Geo. H. Knight,
Edwin Edwards.